United States Patent
Lee

(10) Patent No.: US 12,369,093 B2
(45) Date of Patent: Jul. 22, 2025

(54) METHOD FOR SFC SUPPORT OF EDGEAPP AND DEVICE FOR PERFORMING THE SAME

(71) Applicant: Electronics and Telecommunications Research Institute, Daejeon (KR)

(72) Inventor: Seung-Ik Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 406 days.

(21) Appl. No.: 17/895,553

(22) Filed: Aug. 25, 2022

(65) Prior Publication Data

US 2023/0069154 A1 Mar. 2, 2023

(30) Foreign Application Priority Data

| Aug. 26, 2021 | (KR) | ......................... | 10-2021-0113414 |
| Aug. 31, 2021 | (KR) | ......................... | 10-2021-0115292 |
| Jul. 6, 2022 | (KR) | ......................... | 10-2022-0083333 |

(51) Int. Cl.
*H04W 40/02* (2009.01)
*H04W 24/08* (2009.01)
(Continued)

(52) U.S. Cl.
CPC ........... *H04W 40/02* (2013.01); *H04W 24/08* (2013.01); *H04L 41/50* (2013.01); *H04L 45/306* (2013.01);
(Continued)

(58) Field of Classification Search
CPC ....... H04L 45/00; H04L 45/306; H04L 45/56; H04L 45/655; H04L 2012/562;
(Continued)

(56) References Cited

U.S. PATENT DOCUMENTS

| 7,739,330 | B1 * | 6/2010 | Shafer | ..................... H04L 41/08 |
| | | | | 709/227 |
| 10,638,400 | B1 * | 4/2020 | Xu | ........................ H04W 36/12 |

(Continued)

FOREIGN PATENT DOCUMENTS

| CN | 112311697 | * | 2/2021 | ............ H04L 12/911 |
| CN | 108881448 | * | 6/2021 | ............. H04L 29/08 |

(Continued)

OTHER PUBLICATIONS

Intel et al., "New SID: Study on System Enabler for Service Function Chaining", SA WG2 Meeting #146e, Aug. 16-17, 2021, pp. 1-4.

(Continued)

*Primary Examiner* — Warner Wong
(74) *Attorney, Agent, or Firm* — KILE PARK REED & HOUTTEMAN PLLC

(57) ABSTRACT

Provided are a method for SFC support of EDGEAPP and a device for performing the same. A service function chain support method according to an example embodiment includes receiving a service routing configuration request, constructing a service routing path in response to the service routing configuration request, and controlling forwarding of traffic by successively invoking service APIs configuring the service routing path.

17 Claims, 4 Drawing Sheets

(51) Int. Cl.
*H04L 41/50* (2022.01)
*H04L 45/302* (2022.01)
*H04L 67/00* (2022.01)
*H04L 67/63* (2022.01)
*H04W 28/00* (2009.01)
*H04W 80/06* (2009.01)

(52) U.S. Cl.
CPC .............. *H04L 67/00* (2013.01); *H04L 67/63* (2022.05); *H04W 28/00* (2013.01); *H04W 80/06* (2013.01)

(58) Field of Classification Search
CPC . H04L 2012/6443; H04L 67/00; H04L 67/50; H04L 67/63; H04L 41/50; H04L 2012/5638; H04L 65/40; H04W 4/00; H04W 28/00
See application file for complete search history.

(56) References Cited

U.S. PATENT DOCUMENTS

| | | | |
|---|---|---|---|
| 10,708,279 B2 | 7/2020 | Lee et al. | |
| 2020/0008044 A1* | 1/2020 | Poornachandran | H04L 41/5019 |
| 2020/0028758 A1* | 1/2020 | Tollet | H04L 67/10 |
| 2020/0250013 A1* | 8/2020 | Boran | H04L 65/1033 |
| 2020/0344587 A1 | 10/2020 | Cho et al. | |
| 2021/0111953 A1* | 4/2021 | Hall | H04W 36/322 |
| 2021/0136653 A1* | 5/2021 | Zhang | H04W 48/18 |
| 2021/0184778 A1 | 6/2021 | Kwak et al. | |
| 2021/0282012 A1 | 9/2021 | Lee et al. | |
| 2022/0050732 A1* | 2/2022 | Ma | G06F 8/65 |
| 2022/0136846 A1* | 5/2022 | Bhorkar | H04W 8/20 701/411 |
| 2023/0013720 A1* | 1/2023 | Gupta | H04W 12/08 |
| 2023/0076228 A1* | 3/2023 | Lee | H04L 67/51 |
| 2023/0246954 A1* | 8/2023 | Palumbo | H04L 45/3065 709/238 |
| 2023/0353617 A1* | 11/2023 | Sodagar | H04L 65/60 |
| 2024/0015529 A1* | 1/2024 | Xu | H04W 24/02 |
| 2024/0276567 A1* | 8/2024 | Takakura | H04W 76/10 |
| 2024/0314861 A1* | 9/2024 | Colom Ikuno | H04W 76/11 |
| 2024/0388638 A1* | 11/2024 | Mas Rosique | H04L 67/34 |

FOREIGN PATENT DOCUMENTS

| | | | | |
|---|---|---|---|---|
| KR | 10-2018-0039465 | | 4/2018 | |
| KR | 10-2019-0006789 | | 1/2019 | |
| KR | 10-2021-0054472 | | 5/2021 | |
| WO | WO-2022048261 A1 * | | 3/2022 | ........... H04L 61/103 |

OTHER PUBLICATIONS

3GPP TS 23.558 V17.0.0 (Jun. 2021) 3rd Generation Partnership Project; Technical Specification Group Services and System Aspects; Architecture for enabling Edge Applications; (Release 17); pp. 1-157.

* cited by examiner

METHOD FOR SFC SUPPORT OF EDGEAPP AND DEVICE FOR PERFORMING THE SAME

CROSS-REFERENCE TO RELATED APPLICATIONS

This application claims the benefit of Korean Patent Application No. 10-2021-0113414 filed on Aug. 26, 2021, Korean Patent Application No. 10-2021-0115292 filed on Aug. 31, 2021, and Korean Patent Application No. 10-2022-0083333 filed on Jul. 6, 2022, in the Korean Intellectual Property Office, the entire disclosure of which are incorporated herein by reference for all purposes.

BACKGROUND

1. Field of the Invention

One or more example embodiments relate to a method for SFC support of EDGEAPP and a device for performing the same.

2. Description of the Related Art

Edge computing technology for transmitting data using an edge server is being discussed. Edge computing technology may include multi-access edge computing (MEC) or fog computing (FOC). Edge computing technology may refer to a technology that provides data to an electronic device through a separate server (e.g., edge data network, MEC server, or mobile edge host) installed at a location geographically close to the electronic device, for example, in or near a base station. For example, an application requiring low latency among applications installed in an electronic device may transmit/receive data through an edge server installed in a geographically close location, rather than through a server located in an external data network (DN) (e.g., the Internet).

Services using edge computing technology (e.g., MEC-based services or edge computing services) are being discussed, and research and development on electronic devices to support edge computing services are in progress. For example, an application of the electronic device may transmit/receive edge computing-based data on an edge server (or an application of the edge server) and an application layer.

As research and development to support edge computing services progress, a method for efficiently operating MEC system resources while the edge data network (e.g., MEC server) that provides edge computing services satisfies the service latency requirements is being discussed. For example, a method of redeploying edge computing services to terminals in a hierarchical edge data network is being studied.

The background art described above is possessed or acquired by the inventor in the process of deriving the disclosure of the present application, and cannot necessarily be said to be a known technology disclosed to the general public prior to the present application.

SUMMARY

Due to the closed nature of the existing mobile communication network, it is difficult to utilize network information and services for external MEC applications and interoperate between systems, and as 5G MEC technology is limited to network operator-led use, spread of 5G+ convergence service industry may be limited. In order to spread the 5G+ convergence service industry, it is necessary to share network resources and services within the 5G network and to support service APIs provided (or exposed) by third-party service providers in the 5G MEC platform. In addition, in the EDGEAPP structure, it is possible to process the final transmission after repeatedly invoking the service API required by an edge application server (EAS) in a centralized manner. In this case, issues such as traffic increase, processing delay, EAS load, etc. may occur due to service API transmission/reception.

Example embodiments may directly control and support registration, search, and invocation for service APIs exposed by an EAS in the 5G platform.

Example embodiments may reduce delay and load due to repeated transmission/reception by successively invoking a service API required by the EAS (service function chaining) and sequentially forwarding traffic to the next processing function.

Example embodiments enable network operators to provide a service platform by allowing service APIs provided by third-party service providers to be utilized at the network edge, localize service invocation traffic to the network edge, and allow the MEC platform to actively control the traffic.

However, technical objects are not limited to the above-described technical objects, and other technical objects may exist.

According to an aspect, there is provided a service function chain support method including receiving a service routing configuration request, constructing a service routing path in response to the service routing configuration request, and controlling forwarding of traffic by successively invoking service APIs configuring the service routing path.

One of the service APIs may be a service API required by an EAS which sends the service routing configuration request.

The service API may include one or more or a combination of two or more of a service API provided by an edge enabler server (EES) or a service API provided by another EAS which is different from the EAS.

Traffic processed by the invoked service API may be forwarded sequentially to a next processing function.

The next processing function may be a service function, an EAS, or an EEC.

The method may further include enforcing a service routing rule corresponding to the service routing path.

The constructing may include configuring the service routing path based on a service function chain rule.

The service function chain rule may include application traffic characteristics, application traffic characteristics, information of target APIs required for invocation, order of the target APIs required for invocation, and service KPIs for API invocation.

The service routing path may be configured to include a traffic classification rule, a traffic forwarding/redirection rule, and a necessary service KPI.

The method may further include requesting 5GC to enforce a 3GPP transport layer path to adjust traffic along the service routing path.

According to another aspect, there is provided a service function chain support method including constructing a service routing path in response to a service routing configuration request for successively invoking service APIs required by an EAS, enforcing a service routing rule corresponding to the service routing path, and controlling forwarding of traffic by successively invoking service APIs configuring the service routing path.

The service API may include one or more or a combination of two or more of a service API provided by an EES or a service API provided by another EAS which is different from the EAS.

Traffic processed by the invoked service API may be forwarded sequentially to a next processing function.

The next processing function may be a service function, an EAS, or an EEC.

The constructing may include configuring the service routing path based on a service function chain rule.

The service function chain rule may include application traffic characteristics, application traffic characteristics, information of target APIs required for invocation, order of the target APIs required for invocation, and service KPIs for API invocation.

The service routing path may be configured to include a traffic classification rule, a traffic forwarding/redirection rule, and a necessary service KPI.

The method may further include requesting 5GC to enforce a 3GPP transport layer path to adjust traffic along the service routing path.

According to another aspect, there is provided a service function chain support method including constructing a service routing path in response to a service routing configuration request for successively invoking service APIs required by an edge application server (EAS), enforcing a service routing rule corresponding to the service routing path, requesting 5GC to enforce a 3GPP transport layer path to adjust traffic along the service routing path, and controlling forwarding of traffic by successively invoking service APIs configuring the service routing path.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
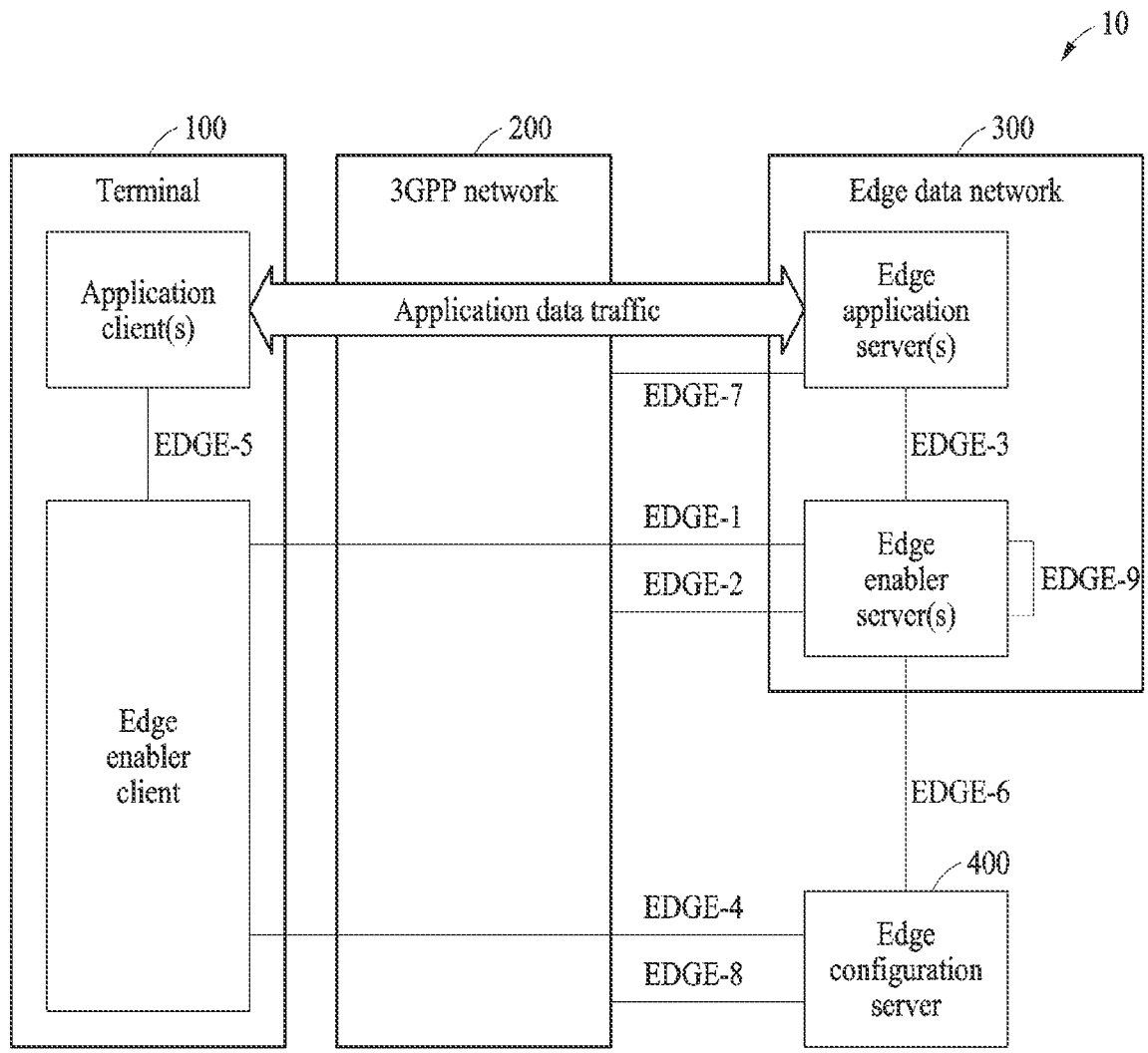
FIG. 1 is a diagram schematically illustrating a network environment for supporting an edge computing service according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms. Various modifications may be made to the example embodiments. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. As used herein, phrases such as "A or B", "at least one of A and B", "at least one of A or B", "A, B or C", "at least one of A, B and C", and "A, B, or C," may include any one of the items listed together in the corresponding one of the phrases, or all possible combinations thereof. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

As used herein, the term 'unit' refers to software or a hardware component such as an FPGA or ASIC, and 'unit' performs certain roles. However, 'unit' is not meant to be limited to software or hardware. The 'unit' may be configured to reside on an addressable storage medium or may be configured to regenerate one or more processors. For example, 'unit' may include components such as software components, object-oriented software components, class components, and task components, processes, functions, properties, procedures, subroutines, segments of program code, drivers, firmware, microcode, circuitry, data, database, data structures, tables, arrays, and variables. Functions provided within components and 'units' may be combined into a smaller number of components and 'units' or further divided into additional components and 'units'. In addition, components and 'units' may be implemented to play one or more CPUs in a device or secure multimedia card. Further, 'unit' may include one or more processors.

Hereinafter, embodiments will be described in detail with reference to the accompanying drawings. In the description with reference to the accompanying drawings, the same components are assigned the same reference numerals regardless of the reference numerals, and the overlapping description thereof will be omitted.

FIG. 1 is a diagram schematically illustrating a network environment for supporting an edge computing service according to an example embodiment.

Referring to FIG. 1, a network environment 10 (e.g., 3GPP 5G MEC platform (EDGEAPP)) may include a terminal 100, a 3rd generation partnership project (3GPP) network (e.g., 3GPP core network) 200, an edge data network 300, and an edge configuration server (ECS) (e.g., edge data network configuration server) 400. The network environment 10 may not be limited to the configurations 100-400 illustrated in FIG. 1.

Each component included in the network environment 10 may refer to a physical entity unit or a software or module unit that performs an individual function. A component included in the network environment 10 may be called an entity or a function.

The terminal 100 may refer to a device used by a user. For example, the terminal 100 may refer to a user equipment (UE), a remote terminal, a wireless terminal, or a user device. The terminal 100 may include all types of electronic devices.

The terminal 100 may include one or more application clients (AC), and edge enabler clients (EEC). The terminal 100 may further include a 3GPP communication layer (not shown). The AC may also be referred to as a UE application (UE App) or a client application. An EEC 120 may also be referred to as a MEC enabling layer (MEL).

The terminal 100 may execute (or drive) one or more ACs. The AC may require different network services (e.g., enhanced mobile broadband (eMBB), ultra-reliable and low latency communication (URLLC), or massive machine type communication (mMTC)). The AC may require different network services based on one or more of a data transmission rate, latency (or rate), reliability of the terminal 100, the number of terminals 100 accessing the network, the network access period of the terminal 100, and average data usage.

The AC may refer to a basic application pre-installed in the terminal 100 or an application provided by a third party. The AC may refer to a client application program driven in the terminal 100 for a specific application service. Several ACs may be driven in the terminal 100. One or more of the ACs may be used to provide an edge computing service from the edge data network 300 to the terminal 100. The AC may exchange service data through interaction with EAS as the client side of MEC application. For example, the AC is an application installed and executed in the terminal 100, and may provide a function of transmitting/receiving data through the edge data network 300. The AC may refer to application software (or module) executed on the terminal 100 to use a function provided by one or more specific EAS (e.g., edge application).

The EEC may refer to a layer that performs an operation within the terminal 100 that enables the terminal 100 to use an edge computing service. The EEC may determine which AC (e.g., UE App) may use the edge computing service, and perform an operation of connecting the network interface so that the data of the AC of the terminal 100 may be delivered to the edge data network 300 that provides the edge computing service. The EEC may search and discover EAS.

In addition, the EEC may perform an operation for the terminal 100 to establish a data connection for using the edge computing service with the 3GPP communication layer. The 3GPP communication layer may refer to a layer that performs a modem operation for using a mobile communication system, and may serve to establish a wireless connection for data communication, register the terminal 100 in the mobile communication system, establish a connection for data transmission in the mobile communication system, and transmit/receive data.

The 3GPP network 200 is a wireless communication system conforming to the standard of the 3rd Generation Partnership Project (3GPP), and may be connected to the terminal 100 to provide a wireless communication service to the terminal 100. The 3GPP network 200 may include, but is not limited to, a 3rd generation (3G) network, an LTE network, an LTE-A network, and a next-generation network (5G or NR), and the 3GPP network 200 may include networks configured with other communication technologies.

The 3GPP network 200 may include a radio access network (RAN) (not shown) and a core network (not shown). The RAN is a network directly connected to the terminal 100, and may be an infrastructure that provides wireless access to the terminal 100. The RAN may include a plurality of base stations, and the plurality of base stations may perform communication through an interface formed therebetween. At least some of the interfaces between the plurality of base stations may be wired or wireless. A base station may be referred to as a gNode B, an eNode B, a Node B, a base station (BS), a radio access unit, a base station controller, a node on a network, or other terms having an equivalent technical meaning. The core network may process data and control signals for the terminal 100 transmitted/received through the RAN. The core network may perform various functions such as control of user plane and control plane, mobility processing, management of subscriber information, billing, and interworking with other types of systems (e.g., long term evolution (LTE) systems). In order to perform the various functions described above, the core network may include a plurality of functionally separated entities having different network functions (NFs). For example, the core network may include one or more of a user plane function (UPF), an access and mobility management function (AMF), a session management function (SMF), a policy control function (PCF), a network exposure function (NEF), and user data management (UDM), a network data analysis function (NWDAF), or a gateway mobile location center (GMLC), or any combination thereof.

The UPF may provide a data path (or data plane) between the terminal 100 and the edge data network 300. The UPF may serve as a gateway for delivering data (or data packets) transmitted/received by the terminal.

The terminal 100 and the edge data network 300 may transmit/receive data (or data packets) to each other through the UPF. A data network (DN) may exist between the edge data network 300 and the UPF.

The UPF may be located close to the edge data network 300 to support the edge computing service to the terminal 100, and may deliver the data packet of the terminal 100 to the edge data network 300 with low latency, or deliver the data packet of the edge data network 300 to the terminal 100 with low latency.

The UPF may provide a data path between the terminal 100 and the edge data network 300 using a data network connected to the Internet. The UPF may route data packets to be delivered to the Internet among data packets transmitted by the terminal 100 to a data network between the service server 400 and the terminal 100.

The NEF may be an NF that exposes capabilities and services of the NFs of the 3GPP network 200 to the outside. The NEF may be connected to an external server (e.g., the edge data network 300) to perform a capability of delivering information about an event occurring in the NF inside the 3GPP network 200 to the external server, or delivering information about an event requested by the external server to the internal NF. For example, the capabilities and services exposed by the NEF to the outside may be location-related event reporting of the terminal 100, session-related event reporting of the terminal 100, and mobility management event reporting of the terminal 100 and the like. The external server may access the corresponding capabilities and services by subscribing the capabilities and services exposed by the NEF.

The edge data network 300 may refer to a server to which the terminal 100 connects to use an edge computing service. The edge data network 300 may be disposed within the base station of the 3GPP network 200 to which the terminal 100 is connected or in a location geographically close to the base station. The edge data network 300 may be referred to as an MEC server, a MEC host, an edge computing server, a mobile edge host, an edge computing platform, and the like.

The edge data network 300 may include one or more EAS and one or more EES.

The edge data network 300 may execute (or drive) one or more EAS. The EAS may be referred to as an edge application, an MEC application, or an ME (MEC) App. EAS may refer to an application application (or application server) provided by a third party (e.g., a service provider) in the edge data network 300 that provides edge computing services. The EAS may be used to establish a data session with the AC in order to transmit/receive data related to the AC. The EAS may establish a data session with the AC. The data session may refer to a communication path formed to transmit/receive data between the AC and the EAS of the terminal 100.

The edge data network 300 may provide a virtual resource to an edge application (e.g., EAS). For example, the virtual resource may include one or more of a computing resource, a storage resource, and a network resource (e.g., network bandwidth) that the EAS may use. The EAS may be executed (or driven) as a virtual machine.

The EES may be referred to as a mobile edge computing platform (MEC), a mobile edge platform (MEP), or a platform.

The EES may provide functions required for the execution of the EAS. For example, the EES may provide a function or environment so that the EAS may provide the edge computing service to the terminal 100 or the EAS may consume the edge computing service. In addition, the EES may perform traffic control or domain name system (DNS) handling.

Edge computing service may collectively refer to services related to procedures and information required to use edge applications (e.g., EAS). The edge computing service may be provided or consumed by the EES and/or the EAS. For example, the EAS may provide an edge computing service to the terminal 100 or may use an edge computing service provided by the EES to provide an edge computing service to the terminal 100. In addition, the EES may provide the EAS with an edge computing service that the EAS may use to provide the edge computing service to the terminal 100. In other words, the edge computing service may refer to a service provided by the edge data network 300 or the EAS to the terminal 100 or a service provided by the EES and available to the EAS.

The EES may provide edge computing services to the EAS. For example, the EES may provide various types of information (e.g., data, content, information about the location of a terminal, caching data, information about a service to be subscribed, etc.) to the EAS according to the edge computing service provided. The EAS may provide the edge computing service to the terminal 100 by using the edge computing service provided by the EES. For example, the EAS may provide an edge computing service to the terminal 100 based on information provided by the EES as an edge computing service. The edge computing service provided to the terminal 100 may be a service required for the terminal 100 to drive an application client (e.g., provide data required to drive the application client).

The EES may include an MEC service (not shown) and a service registry (not shown). The MEC service may provide an edge computing service to EASs included in the edge data network 300. The MEC service may be implemented as software or a module that may perform individual functions. The service registry may provide information on edge computing services available in the edge data network 300.

The EES may internally register the EAS when an instance of the EAS is instantiated. The EES may register the EAS and store information related to the EAS. The EAS-related information stored by the EES may include information on the edge computing service that the EAS intends to provide to the terminal 100 and the like, and information on whether the edge computing service is a required service or an optional service for the EAS.

The EAS may register a new edge computing service with the EES, update an edge computing service already registered, or search for an edge computing service registered with the EES. The EAS may provide the EES with information on the edge computing service to be registered or updated while registering or updating the edge computing service in the EES. The EES may register edge computing services with a service registry.

The EES may deliver information about edge computing services registered in the service registry to the EAS in the edge data network 300. For example, the EES may deliver a list of edge computing services registered in the service registry to the EAS. In addition, the EES may deliver information on availability of edge computing services registered in the service registry or newly registered to the EAS.

The EAS may subscribe to the edge computing service registered in the service registry. The EAS may subscribe to the edge computing service by delivering subscription request information for the edge computing service to the EES. When the EAS subscribes to the edge computing service, it may mean that the edge computing service or information on the edge computing service is continuously provided from the EES.

The ECS may provide support functions for the terminal 100 to connect with the EES. The ECS 400 may be referred to as an edge data network management server, a configuration server, etc., and may perform the function of a mobile edge platform manager (MEPM) or a multi-access edge orchestrator (MEO). The ECS 400 may refer to a MEC management proxy (MMP) server or a Domain Name System (DNS) server.

The ECS 400 may refer to an initial access server through which the terminal 100 may receive edge data network configuration information for using an edge computer service. The ECS 400 may know the deployment of edge data networks, and the terminal 100 may access the ECS 400 and receive configuration information required for using an edge computing service, for example, information on an edge data network to be accessed at a specific location.

The ECS 400 may perform a function of provisioning edge data network configuration information to the EEC of the terminal 100. For example, the edge data network configuration information may include information for the terminal 100 to connect to the edge data network 300 using the service area information (e.g., information on edge data networks that provide services in a certain area, etc.) and information for establishing a connection with the EES 330 (e.g. information to identify edge data networks, etc.).

Figure 2:
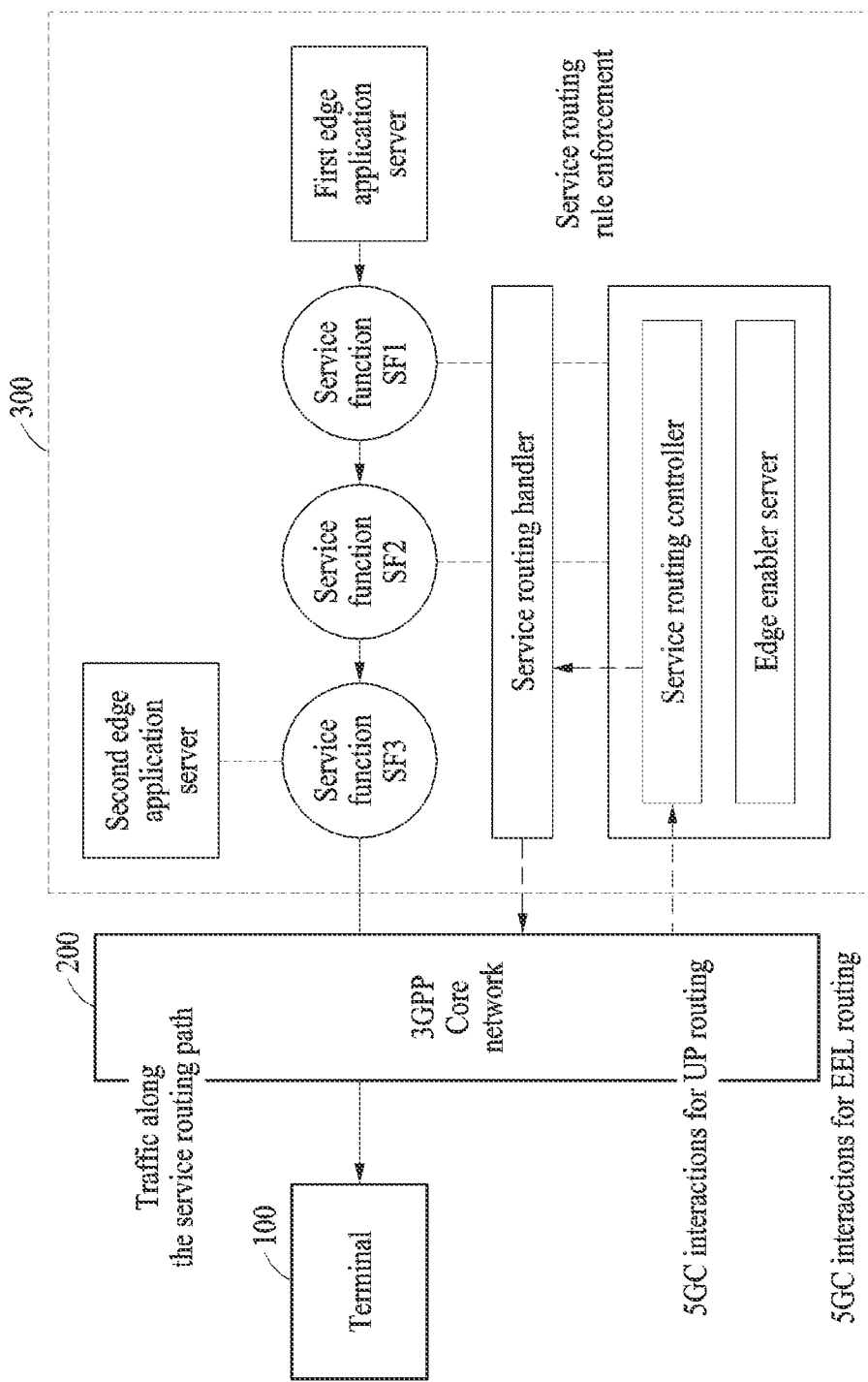
FIG. 2 is a diagram illustrating a service function chaining operation within a network environment for supporting an edge computing service according to an example embodiment.

FIG. 2 is a diagram illustrating a service function chaining operation within a network environment for supporting an edge computing service according to an example embodiment.

In the network environment 10 (e.g., 3GPP 5G MEC platform (EDGEAPP)), an end-to-end service (e.g., MEC service) may be delivered through a service function chaining operation. In the delivery of the end-to-end service, multiple service functions may be connected together. A service function chaining operation may refer to an operation to connect and deliver several service functions successively (or at once) in order to provide an end-to-end service (e.g., MEC service). For example, the service function chaining operation may include operations such as traffic routing, steering, and forwarding.

A service function chain for a 5G network may include one or more service functions. For example, the service function chain may include one or more, or a combination of two or more service functions of firewall function, NAT, antimalware, parental control, DDoS protection, TCP proxy, load balancer, KPI monitoring and video optimization, but is not necessarily limited thereto.

The service function may be a service function provided by the EES (e.g., a network operator) and/or the EAS (e.g., a third service provider), and may be provided (e.g., distributed) as a service API. The edge data network 300 (e.g., EAS, EES) may process service function chaining operations (e.g., traffic routing, steering, forwarding) in the data plane.

The EES or EAS(s) (e.g., the first EAS and the second EAS) may provide a service API as a service function. The EAS may be implemented by invoking one or more service functions. The EES may include a service routing controller and a service routing handler. The EES may provide a service routing controller and a service routing handler functionality for a service function chaining operation.

The service routing controller may determine a routing rule for constructing a service routing path for application traffic (e.g., specific application traffic) based on a request (or demand) of the EAS or 5GC. A service routing path may be called a service function chain, a service function path, and/or a service function chain path. The routing rule may refer to a combination of real addresses (e.g., EAS and/or EES addresses) that instantiate a service function chain.

The service routing controller may enforce routing rules in the service routing handler.

The service routing controller may dynamically update (or change) routing rules (e.g., existing (or corresponding) routing rules) based on mobility, relocation, availability, and instantiation of the edge data network 300 entity (e.g., EAS, Service API, EES).

The service routing controller may dynamically update routing rules (e.g., existing (or corresponding) routing rules) based on monitoring result of the service KPI(s) (e.g., performance, throughput, delay, etc.), load balancing, resource efficiency, and traffic optimization.

The service routing controller may request the configuration of a transport layer (e.g., 5G CN) path to 5GC (e.g., 5G Core) to steer application traffic according to the determined service routing path (according to the UP connectivity).

The service routing handler may classify application traffic between EEC/EAS/service APIs (or service functions).

The service routing handler may determine a service routing path (e.g., a specific service routing path) for incoming application traffic based on a routing rule provided by the service routing controller.

The service routing handler may forward (e.g., forward/redirect) incoming application traffic to the next entity (or entity of next hop) (e.g., AC, service function, EAS, and/or EEC) along the service routing path.

As shown in FIG. 2, in the network environment 10 (e.g., 3GPP 5G MEC platform (EDGEAPP)), the first EAS may not process the final transmission after repeatedly invoking the service API(s) (e.g., service function (SF1), service function (SF2), service function (SF3)) required by the first EAS in a centralized manner. Required service API(s) are successively invoked along the service routing path by the EES (e.g., service routing controller, service routing handler), and traffic (e.g., application traffic) may be delivered sequentially to the next processing function (e.g., service function, AC, EAS, and/or EEC). For example, the service function SF1 and the service function SF2 may be service functions (e.g., service API) provided by the EES, and the service function SF3 may be a service function (e.g., service API) provided by the second EAS. The edge data network 300 (e.g., EAS, EES) successively invokes service APIs required by the EAS (e.g., first EAS) (service function chaining), and sequentially delivers traffic to the next processing function to reduce repeated transmission/reception delay and load.

Figure 3:
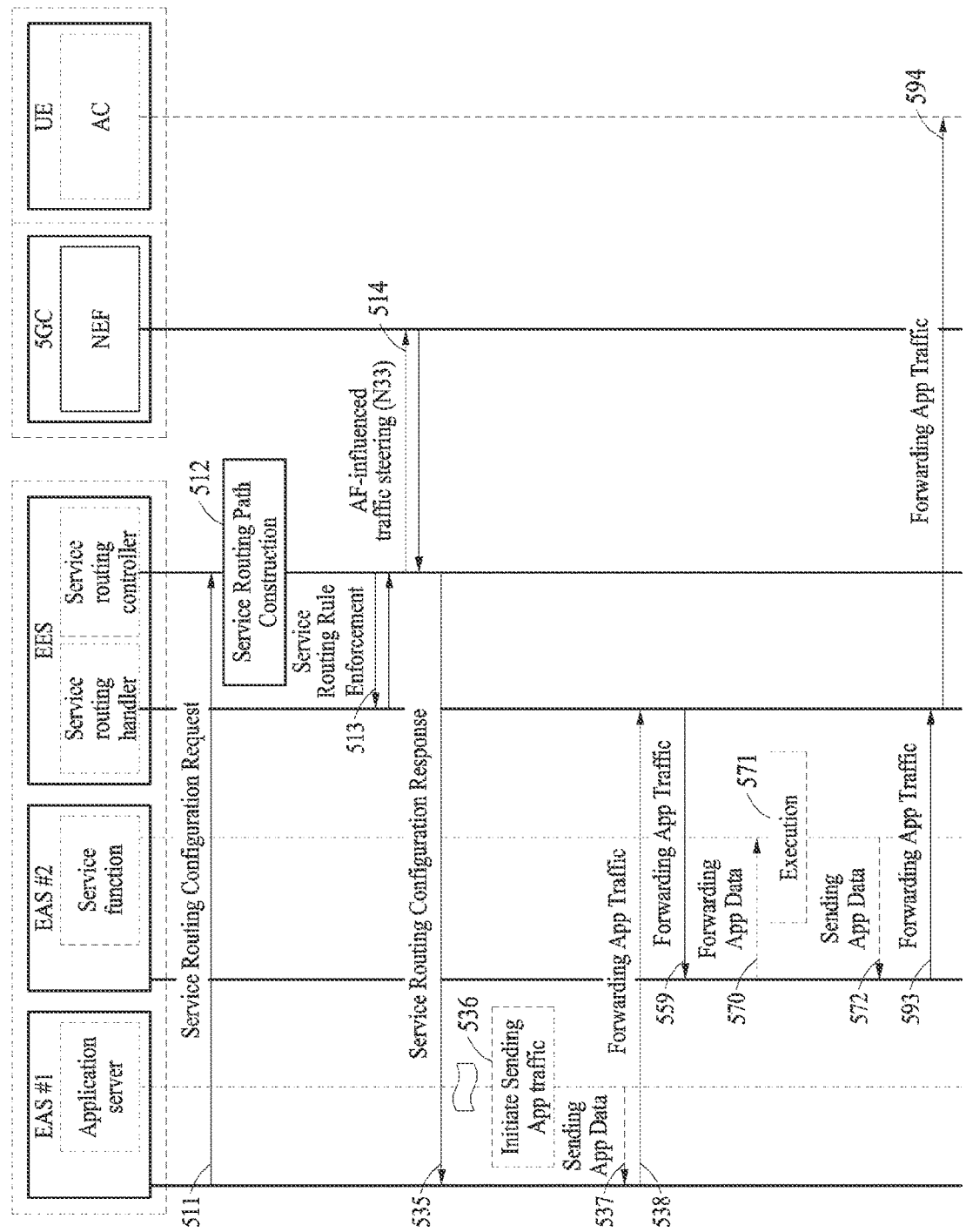
FIG. 3 is a flowchart illustrating an operation of constructing a service routing path in an EDGEAPP architecture and forwarding traffic according to the service routing path according to an example embodiment.

FIG. 3 is a flowchart illustrating an operation of constructing a service routing path in an EDGEAPP architecture and forwarding traffic according to the service routing path according to an example embodiment.

For convenience of explanation, it is assumed in FIG. 3 that the service API required by the first EAS (EAS #1) includes the service function SF1, the service function SF2, and the service function SF3 shown in FIG. 2.

In operation 511, the first EAS (EAS #1) may transmit a service routing configuration request (e.g., a configuration request for a service routing path) to a service routing controller of the EES. The service routing configuration request may be for invoking a service API required by the first EAS (EAS #1) in a chain (service function chaining).

Before initiating the sending of application traffic through the service routing path (or service function chain path), the first EAS (EAS #1) may request the EES to configure a service routing path based on the service function chain rule (e.g., ingress application traffic characteristics, egress application traffic characteristics, information of target API(s) required for invocation, order of target API(s) required for invocation, service KPIs for API invocation). The service function chain rule may refer to an invocation repair document of a service function (API), and may include an incoming/outgoing characteristic, an API characteristic, and the like. The service function chain rule may be a logical configuration corresponding to service/application logic. The service routing configuration request may be to allow the EES to configure a service routing path based on a service function chain rule.

In operation 512, the service routing controller of the EES may create (e.g., construct) a service routing path. For example, the service routing controller may configure the service routing path by discovering the EAS exposing the service API based on the routing rule. The service API may be a service function required to execute a requested service routing path (e.g., a service function chain) while meeting a requested service KPI.

In operation 513, the service routing handler of the EES may apply a service routing rule corresponding to the service routing path. The service routing controller of EES may enforce service routing rules on service routing handlers by providing service routing paths configured to include traffic classification rule, traffic forwarding/redirection rule, a required service KPI, etc.

In a distributed deployment, multiple EESs may be deployed and service routing handlers (or service routing handler functions) may be provided in a distributed manner. Accordingly, the service routing controller of EES may enforce a service routing path to a remote service routing handler of other EES(s) that maintain the target EAS/EES service API(s) in the remote service area.

The service routing controller of the EES may update an already configured service routing path based on at least one of mobility, relocation, availability, instantiation of EDN entities (e.g. EAS, service API, EES, etc.), monitoring results of service KPIs (e.g., performance, throughput, delay, etc.), load balancing, resource efficiency, and traffic optimization or a combination of two or more thereof. The updated service routing path may be enforced in addition to the service routing handler(s).

In operation 514, the service routing controller of the EES may request the 5GC to enforce a 3GPP transport layer (e.g., 5G CN) path in order to steer application traffic along the service function path (e.g., along the UP connectivity).

In operation 535, the service routing controller of the EES may send a service routing configuration response (e.g., a result of Service Routing Path construction) to the first EAS (EAS #1).

In operations 536 and 537, if the requested service routing path is successfully configured, the application server of the first EAS (EAS #1) may initiate sending the application traffic according to the UE's request or application logic (e.g., application logic of the application server).

In operation 558, the first EAS (EAS #1) may deliver (e.g., forward) the application traffic received from the local application server (e.g., the application server of the first EAS (EAS #1)) to the corresponding EES.

In operation 559, upon receiving the application traffic, the service routing handler of the EES may deliver (e.g., forward) the application traffic to the second EAS (EAS #2) at a next hop along the service routing path. Here, the service routing handler of the EES may classify the ingress application traffic based on the traffic classification rule configured by the service routing controller to deliver application traffic to the second EAS (EAS #2) on the next hop along the service routing path.

In operation 570, upon receiving the application traffic, the second EAS (EAS #2) may deliver (e.g., forward) the received application traffic to a service function (e.g., a local service function). In operations 571 and 572, the service function of the second EAS (EAS #2) may process the received application traffic to respond with a service function execution result (e.g., an execution result of application logic).

In operation 593, the second EAS (EAS #2) may respond to the EES by forwarding the application traffic that is the result of executing the service function.

In operation 594, upon receiving the application traffic, the service routing handler of the EES may forward the application traffic to the UE through the 3GPP transport layer at a next hop along the service routing path. Here, the service routing handler may classify the ingress application traffic based on the traffic classification rule configured by the service routing controller to forward application traffic to the EAS on the next hop along the service routing path. If the received application traffic is determined to be egress application traffic (in other words, the application traffic is the execution result of an entire step along the service routing path, and the next hop is the UE), the service routing handler may forward the application traffic to the UE through the 3GPP transport layer.

Figure 4:
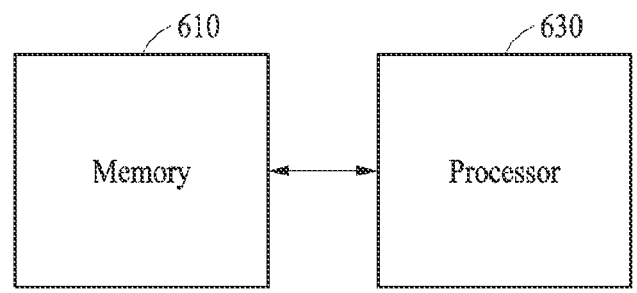
FIG. 4 is a schematic block diagram illustrating a device according to an example embodiment.

FIG. 4 is a schematic block diagram illustrating a device according to an example embodiment.

Referring to FIG. 4, according to an example embodiment, a device 600 (e.g., a server device) may be substantially the same as the EAS and/or EES described with reference to FIGS. 1 to 3. The device 600 may include a memory 610 and a processor 630.

According to various example embodiments, the memory 610 may store instructions (e.g., a program) executable by the processor 630. For example, the instructions may include instructions for executing an operation of the processor 630 and/or an operation of each component of the processor 630.

According to various example embodiments, the memory 610 may be implemented as a volatile memory device or a nonvolatile memory device. Volatile memory devices may be implemented as dynamic random access memory (DRAM), static random access memory (SRAM), thyristor RAM (T-RAM), zero capacitor RAM (Z-RAM), or twin transistor RAM (TTRAM). Nonvolatile memory devices may be implemented as Electrically Erasable Programmable Read-Only Memory (EEPROM), Flash memory, Magnetic RAM (MRAM), Spin-Transfer Torque (STT)-MRAM, and Conductive Bridging RAM (CBRAM), Ferroelectric RAM (FeRAM), Phase change RAM (PRAM), Resistive RAM (RRAM), Nanotube RRAM, Polymer RAM (Polymer RAM (PoRAM)), Nano Floating Gate Memory Memory (NFGM)), holographic memory, Molecular Electronic Memory Device, and/or Insulator Resistance Change Memory.

According to various example embodiments, the processor 630 may execute computer readable code (e.g., software) stored in the memory 610 and instructions induced by the processor 530. The processor 630 may be a hardware-implemented data processing device having a circuit having a physical structure for executing desired operations. The desired operations may include, for example, code or instructions included in a program. A data processing device implemented as hardware may include, for example, a microprocessor, a central processing unit, a processor core, a multi-core processor, a multiprocessor, an Application-Specific Integrated Circuit (ASIC), and a Field Programmable Gate Array (FPGA).

According to various example embodiments, the operation performed by the processor 630 is substantially the same as the operation of the EAS and/or EES described with reference to FIGS. 1 to 3. Accordingly, detailed description will be omitted.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A service function chain support method, the method comprising:
  receiving a service routing configuration request;
  constructing a service routing path in response to the service routing configuration request; and
  controlling forwarding of traffic by successively invoking service APIs configuring the service routing path,
  wherein the service routing path is configured to comprise a traffic classification rule, a traffic forwarding/redirection rule, and a necessary service KPI.

2. The method of claim 1, wherein one of the service APIs is a service API required by an edge application server (EAS) which sends the service routing configuration request.

3. The method of claim 2, wherein the service API comprises one or more or a combination of two or more of a service API provided by an edge enabler server (EES) or a service API provided by another EAS which is different from the EAS.

4. The method of claim 1, wherein traffic processed by the invoked service API is forwarded sequentially to a next processing function.

5. The method of claim 4, wherein the next processing function is a service function, an EAS, or an edge enabler client (EEC).

6. The method of claim 1, further comprising:
  enforcing a service routing rule corresponding to the service routing path.

7. The method of claim 1, wherein the constructing comprises configuring the service routing path based on a service function chain rule.

8. The method of claim 7, wherein the service function chain rule comprises application traffic characteristics, application traffic characteristics, information of target APIs required for invocation, order of the target APIs required for invocation, and service KPIs for API invocation.

9. The method of claim 1, further comprising:
  requesting 5GC to enforce a 3GPP transport layer path to adjust traffic along the service routing path.

10. A service function chain support method, the method comprising:
  constructing a service routing path in response to a service routing configuration request for successively invoking service APIs required by an edge application server (EAS);
  enforcing a service routing rule corresponding to the service routing path; and
  controlling forwarding of traffic by successively invoking service APIs configuring the service routing path,
  wherein the service routing path is configured to comprise a traffic classification rule, a traffic forwarding/redirection rule, and a necessary service KPI.

11. The method of claim 10, wherein the service API comprises one or more or a combination of two or more of a service API provided by an edge enabler server (EES) or a service API provided by another EAS which is different from the EAS.

12. The method of claim 10, wherein traffic processed by the invoked service API is forwarded sequentially to a next processing function.

13. The method of claim 10, wherein the next processing function is a service function, an EAS or an edge enabler client (EEC).

14. The method of claim 10, wherein the constructing comprises configuring the service routing path based on a service function chain rule.

15. The method of claim 14, wherein the service function chain rule comprises application traffic characteristics, application traffic characteristics, information of target APIs required for invocation, order of the target APIs required for invocation, and service KPIs for API invocation.

16. The method of claim 10, further comprising:
   requesting 5GC to enforce a 3GPP transport layer path to adjust traffic along the service routing path.

17. A service function chain support method comprising:
   constructing a service routing path in response to a service routing configuration request for successively invoking service APIs required by an edge application server (EAS);
   enforcing a service routing rule corresponding to the service routing path;
   requesting 5GC to enforce a 3GPP transport layer path to adjust traffic along the service routing path; and
   controlling forwarding of traffic by successively invoking service APIs configuring the service routing path,
   wherein the service routing path is configured to comprise a traffic classification rule, a traffic forwarding/redirection rule, and a necessary service KPI.

* * * * *